(12) United States Patent
Tehranipoor et al.

(10) Patent No.: US 12,105,858 B2
(45) Date of Patent: Oct. 1, 2024

(54) SYSTEMS AND METHODS FOR LASER PROBING FOR HARDWARE TROJAN DETECTION

(71) Applicant: University of Florida Research Foundation, Incorporated, Gainesville, FL (US)

(72) Inventors: Mark M. Tehranipoor, Gainesville, FL (US); Andrew Stern, Gainesville, FL (US); Shahin Tajik, Gainesville, FL (US); Farimah Farahmandi, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 52 days.

(21) Appl. No.: 17/196,035

(22) Filed: Mar. 9, 2021

(65) Prior Publication Data

US 2021/0286905 A1 Sep. 16, 2021

Related U.S. Application Data

(60) Provisional application No. 62/987,898, filed on Mar. 11, 2020.

(51) Int. Cl.
| | |
|---|---|
| *G06F 21/78* | (2013.01) |
| *G01R 31/311* | (2006.01) |
| *G06F 1/10* | (2006.01) |
| *G06F 1/28* | (2006.01) |
| *G06F 21/55* | (2013.01) |

(52) U.S. Cl.
CPC ............ *G06F 21/78* (2013.01); *G01R 31/311* (2013.01); *G06F 1/10* (2013.01); *G06F 1/28* (2013.01);
(Continued)

(58) Field of Classification Search
CPC ... G06F 21/78; G06F 1/10; G06F 1/28; G06F 21/55; G06F 2221/034; G01R 31/311
See application file for complete search history.

(56) References Cited

U.S. PATENT DOCUMENTS

| | | | |
|---|---|---|---|
| 11,693,966 B2 * | 7/2023 | Schat | G06F 21/567 |
| | | | 726/23 |
| 2011/0026806 A1 * | 2/2011 | Bernstein | G01R 31/311 |
| | | | 382/145 |

(Continued)

OTHER PUBLICATIONS

Bhunia et al., 'Hardware Trojan Attacks: Threat Analysis and Countermeasures.' Proceedings of the IEEE, vol. 102, No. 8. Aug. 2014, p. 1229-1247. (Year: 2014).*

(Continued)

*Primary Examiner* — Han Yang
*Assistant Examiner* — Zhe Liu
(74) *Attorney, Agent, or Firm* — ALSTON & BIRD LLP

(57) ABSTRACT

A method includes in part, generating an electro-optical frequency map (EOFM) of an active layer of an integrated circuit (IC), retrieving a reference map of the IC, comparing the EOFM of the IC with the reference map to determine whether there is a match between an intensity of an identified region in the EOFM map and an intensity of a corresponding region of the reference map, and detecting one or more hardware trojans in the IC if there is no match. The reference map may be associated with a layout of an IC known not to include hardware trojans. The reference map also may be a second EOFM associated with the IC. Alternatively, the reference map may be generated by applying power to the IC, and applying a clock signal to the IC.

18 Claims, 12 Drawing Sheets
(12 of 12 Drawing Sheet(s) Filed in Color)

(52) U.S. Cl.
CPC ........ *G06F 21/55* (2013.01); *G06F 2221/034* (2013.01)

(56) References Cited

U.S. PATENT DOCUMENTS

| | | | | |
|---|---|---|---|---|
| 2014/0331098 | A1* | 11/2014 | Martin | G01R 31/318547 714/727 |
| 2015/0153408 | A1* | 6/2015 | Otaka | G01R 31/311 324/754.23 |
| 2015/0187059 | A1* | 7/2015 | Hotta | G06K 9/6201 382/145 |
| 2016/0109513 | A1* | 4/2016 | Vickers | G01R 31/311 324/754.23 |
| 2016/0116531 | A1* | 4/2016 | Ranganathan | G01R 31/2834 324/754.23 |
| 2018/0027003 | A1* | 1/2018 | Bahgat Shehata | G06F 21/564 726/23 |
| 2018/0033704 | A1* | 2/2018 | Suzuki | H01L 21/67282 |
| 2018/0128869 | A1* | 5/2018 | Nonaka | G01R 31/2621 |
| 2019/0147216 | A1* | 5/2019 | Yang | G06V 40/193 382/103 |
| 2019/0371682 | A1* | 12/2019 | Suzuki | G01R 31/2836 |

OTHER PUBLICATIONS

Sheng et al., 'Application of electro optical frequency mapping (EOFM) in scan chain failure analysis for Asic.' IEEE 24th International Symposium on the Physical and Failure Analysis of Integrated Circuits. 2017, p. 1-5. (Year: 2017).*

Beyreuther et al., 'EOFM measurements of lateral and vertical Bipolar Transistors in Silicon and SiGe:C Technologies.' IEEE 26th International Symposium on the Physical and Failure Analysis of Integrated Circuits. Jul. 2019, p. 1-4. (Year: 2019).*

Vincent, 'Morphological grayscale reconstruction in image analysis: applications and efficient algorithms.' IEEE transactions on image processing. Apr. 1993, p. 176-201. (Year: 1993).*

Tehranipoor et al., "Physical Assurance." Springer, Cham [online]. Feb. 2012. Retrieved from the Internet:<URL: https://link.springer.com/content/pdf/10.1007/978-3-030-62609-9.pdf>. Chapter 6.2.2.2: EOFM and EOP Signal Measurement, p. 138-140. (Year: 2012).*

Nowroz et al., "Novel Techniques for High-Sensitivity Hardware Trojan Detection Using Thermal and Power Maps," in IEEE Transactions on Computer-Aided Design of Integrated Circuits and Systems, vol. 33, No. 12, Dec. 2014, p. 1792-1805 (Year: 2014).*

Hamann, et al., "Hotspot-limited microprocessors: Direct temperature and power distribution measurements," IEEE Journal of Solid-State Circuits 42.1, 2006, p. 56-65 (Year: 2006).*

Melendez et al., "Fast 3D electro-optical frequency mapping and probing in frequency domain," 2016 IEEE International Reliability Physics Symposium (IRPS), 2016, p. 1-5 (Year: 2016).*

"Clock Generator", Adafruit Industries, Mar. 29, 2018 [retrieved on Nov. 13, 2023], retrieved from the Internet: <URL: https://learn.adafruit.com/some-digital-tools/clock-generator> (Year: 2018).*

Tajik et al. "Emission Analysis of Hardware Implementations." 17th Euromicro Conference on Digital System Design. Aug. 2014, p. 528-534 (Year: 2014).*

\* cited by examiner

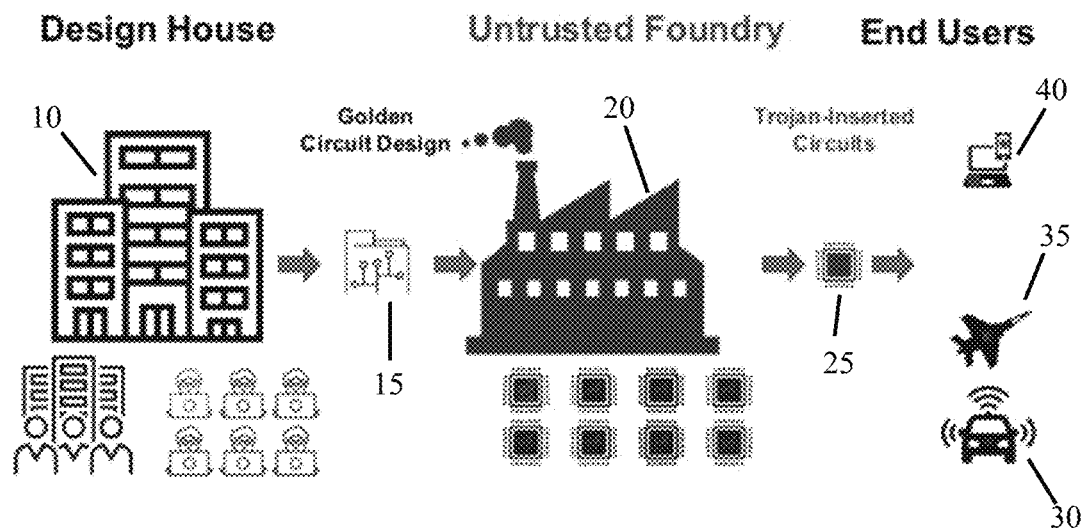
Figure 1
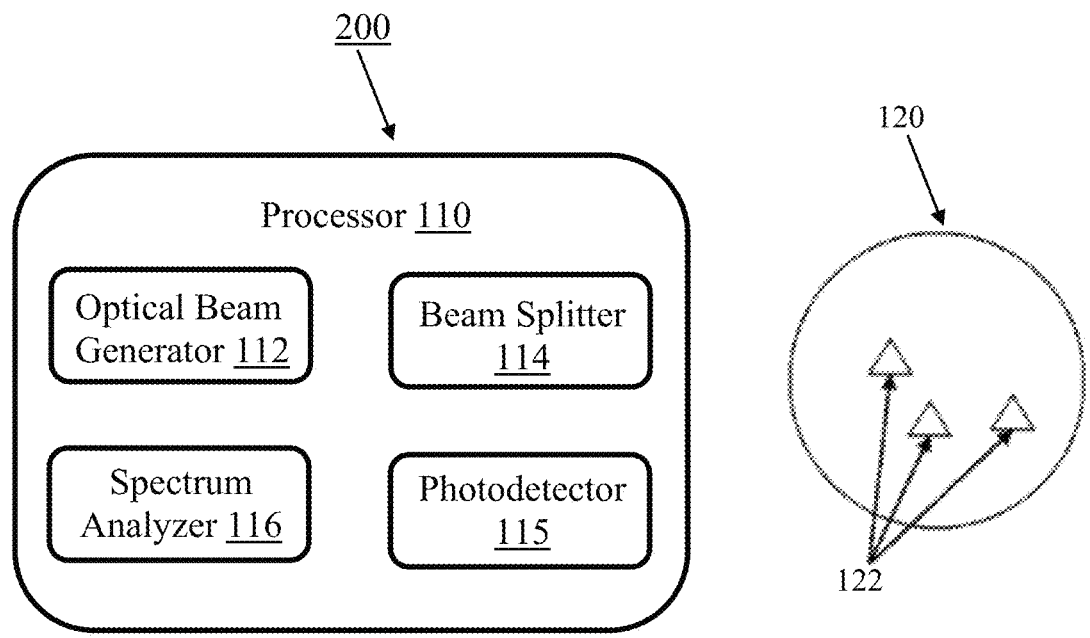
Figure 2A
Figure 2B

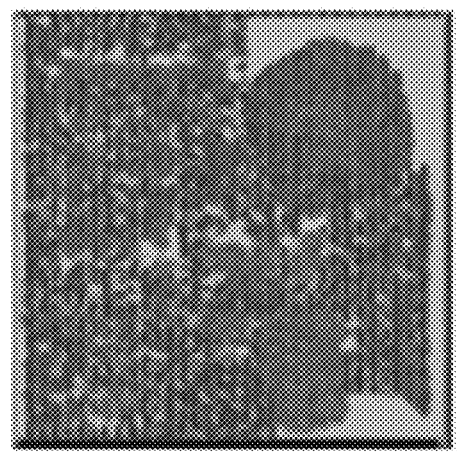
Figure 5A
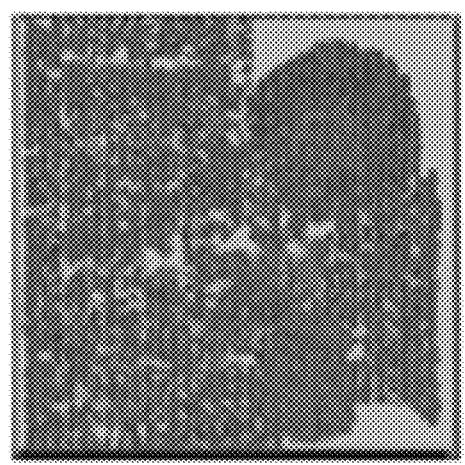
Figure 5B
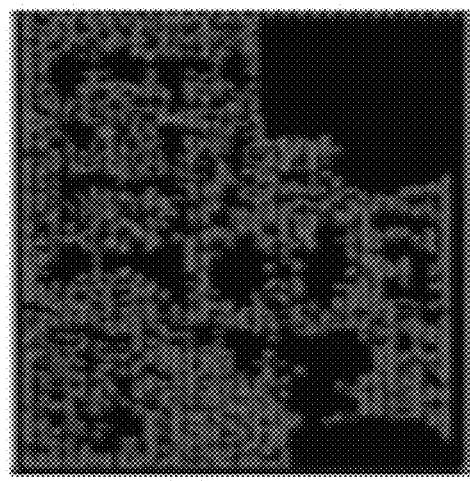
Figure 5C

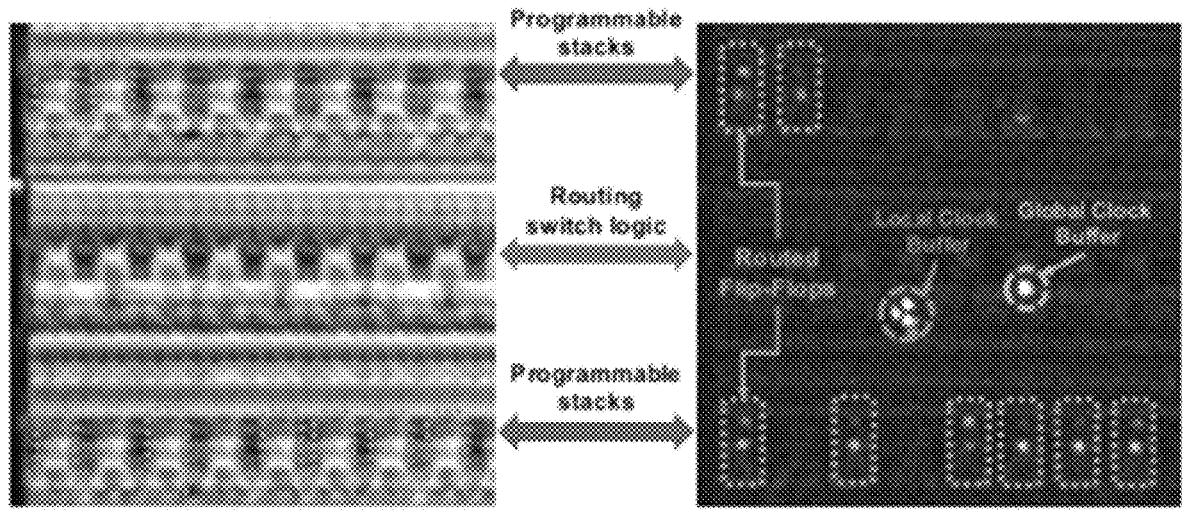
Figure 6A                    Figure 6B
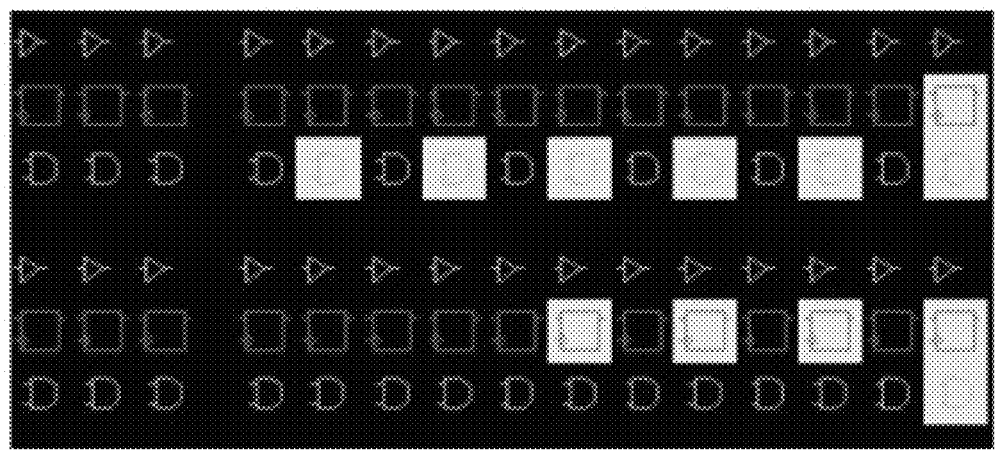
Figure 7

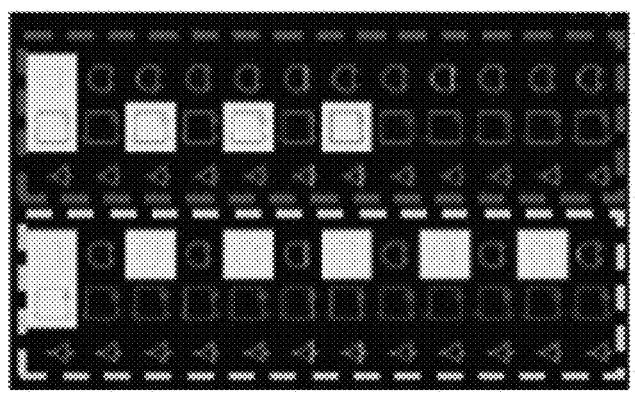
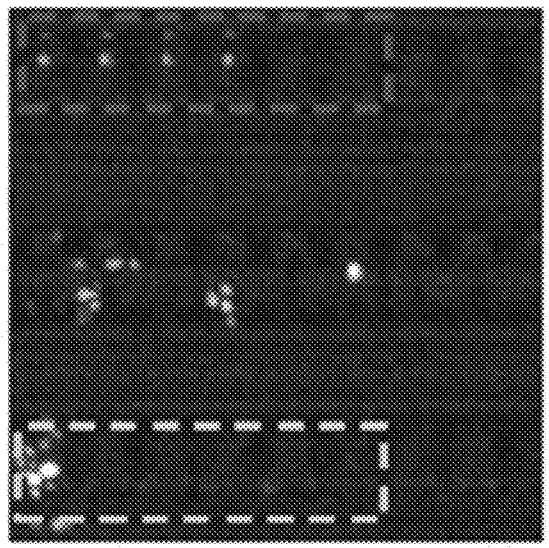
Figure 8A
Figure 8B
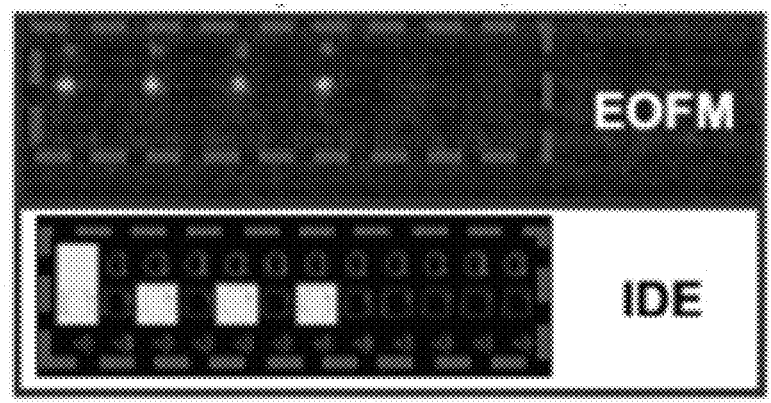
Figure 9A

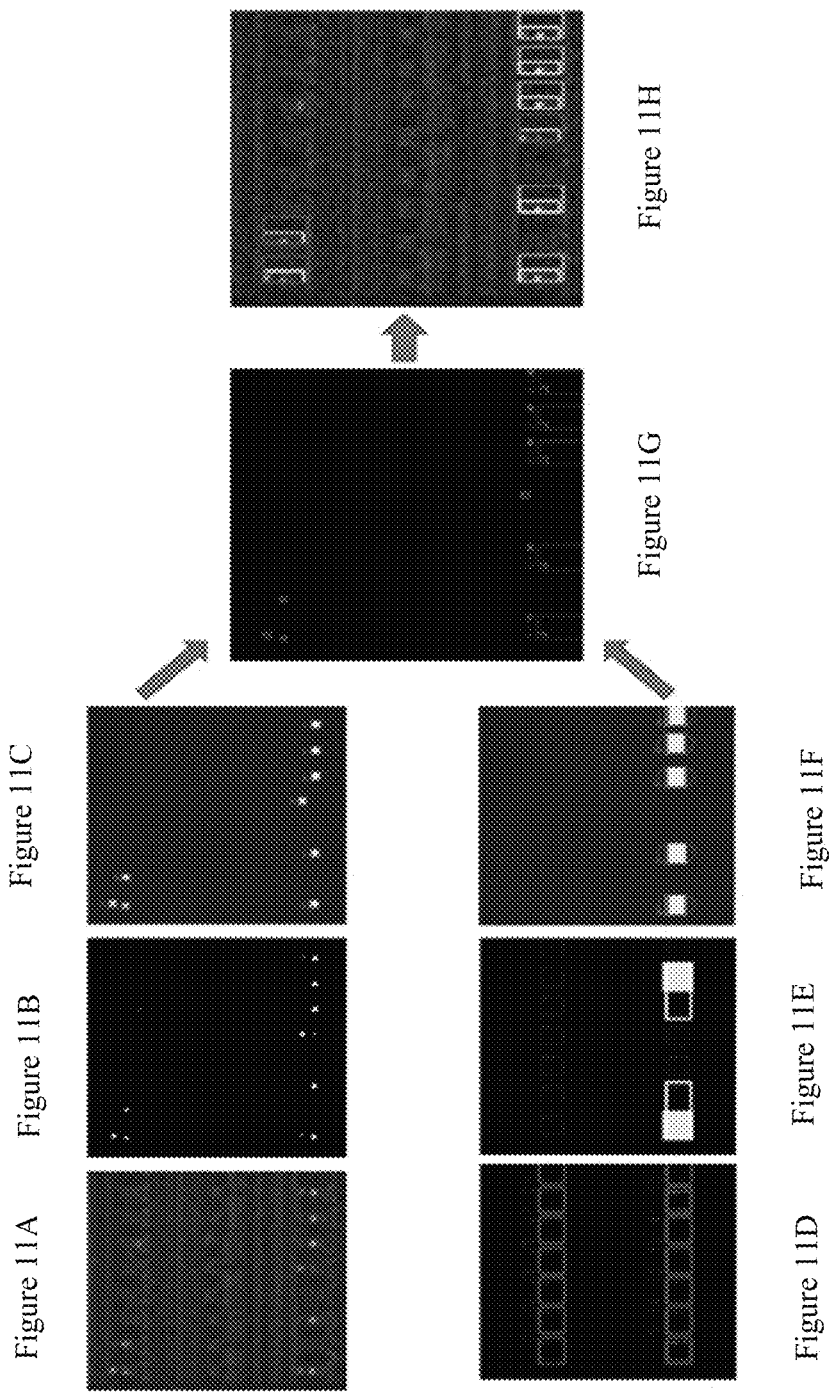

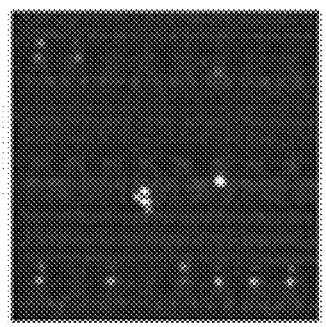
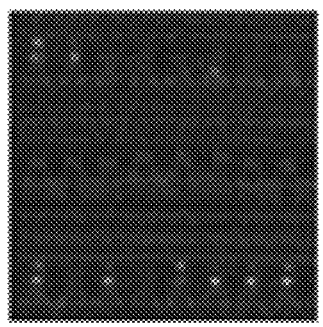
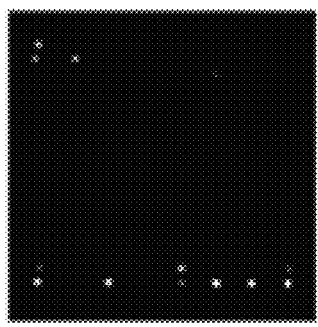
Figure 14A　　　　　Figure 14B　　　　　Figure 14C
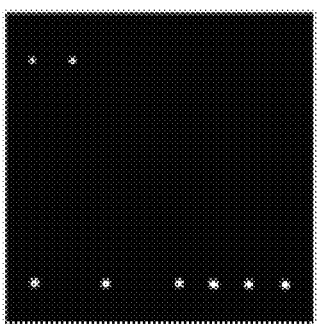
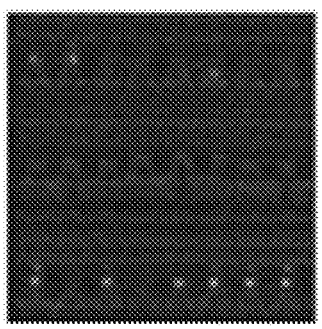
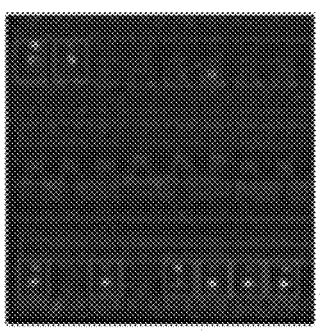
Figure 14D　　　　　Figure 14E　　　　　Figure 14F
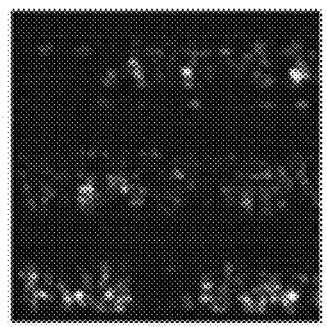
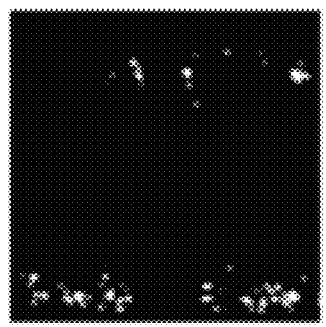
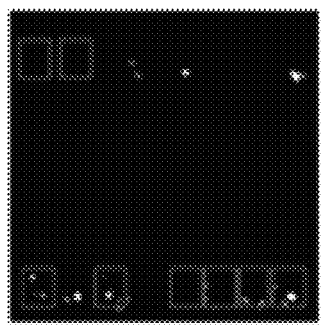
Figure 14G　　　　　Figure 14H　　　　　Figure 14I
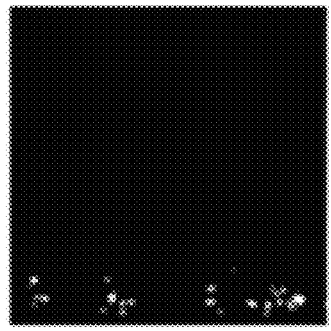
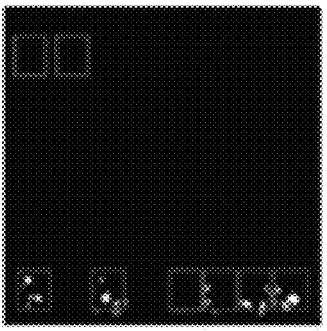
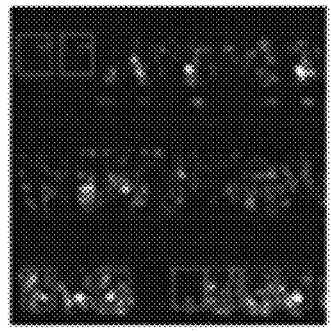
Figure 14J　　　　　Figure 14K　　　　　Figure 14L

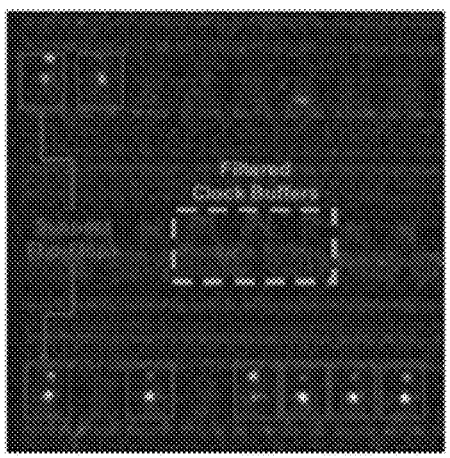 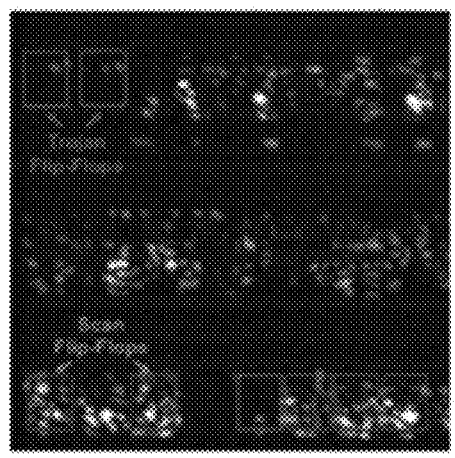
Figure 15A                    Figure 15B

SYSTEMS AND METHODS FOR LASER PROBING FOR HARDWARE TROJAN DETECTION

CROSS-REFERENCE TO RELATED APPLICATION

The present application claims benefit under 35 USC 119(e) of U.S. Application Ser. No. 62/987,898, filed Mar. 11, 2020, which is incorporated herein by reference in its entirety.

TECHNICAL FIELD

The present application relates to detection of hardware Trojans in semiconductor integrated circuits, and more specifically to using lasers to probe and detect hardware Trojans.

BACKGROUND

The globalization of integrated circuits (ICs) design and fabrication have made critical systems vulnerable to an array of attacks. The move towards overseas fabrication enables untrusted foundries to modify ICs and introduce malicious circuitry known as hardware Trojans. Hardware Trojans are capable of extracting privileged information from ICs, enabling access through covert channels, and even disabling device functionality. As embedded electronics continue to be utilized within numerous systems ranging from smartphones to connected automobiles and critical infrastructure, the potential threat of hardware Trojans warrants an effective response. Existing post-silicon Trojan detection methods rely on destructive reverse engineering, applying complex test processes (e.g., side-channel analysis), or comparisons against golden ICs. There is a need for non-destructive methods to detect Trojans in ICs.

SUMMARY

A method, in accordance with one embodiment of the present disclosure, includes in part, generating an electro-optical frequency map (EOFM) of an active layer of an integrated circuit (IC), retrieving a reference map of the integrated circuit, comparing the EOFM of the IC with the reference map to determine whether there is a match between an intensity of an identified region in the EOFM map and an intensity of a corresponding region of the reference map, and detecting one or more hardware trojans in the IC if there is no match.

In one embodiment, the reference map is associated with a layout of an IC known not to include hardware trojans. In one embodiment, the reference map is a second EOFM associated with the IC.

In one embodiment, the first EOFM of the active layer of the IC is generated by passing an optical beam to a backside of the IC while applying power and a clock signal to the IC, receiving one or more reflected optical beams reflected from the active layer of the IC, extracting amplitudes of the one or more reflected optical beams at a selected frequency, and generating the first EOFM from the extracted amplitudes. In one embodiment, the hardware Trojan is one of a sequential hardware Trojan or a combinational hardware Trojan.

In one embodiment, the reference map is generated by applying power to the IC, and applying a clock signal to the IC. In such embodiments, the (EOFM) of the IC is generated while placing the IC in a scan mode, and applying an alternating bit pattern to a scan chain disposed in the IC.

In one embodiment, the method further includes, in part, generating the first EOFM at a first frequency, generating a second EOFM of the IC at a second frequency, and subtracting data associated with the first EOFM from the data associated with second EOFM to mitigate noise. In one embodiment, the method further includes, in part, applying a threshold to convert the first EOFM data to binary data. In one embodiment, the method further includes, in part, applying erosion and dilation to the binary data to mitigate noise.

A system, in accordance with one embodiment of the present invention, is configured to generate a first electro-optical frequency map (EOFM) of an active layer of an integrated circuit (IC), retrieve a reference map of the integrated circuit, compare the first EOFM of the IC with the reference map to determine whether there is a match between an intensity of an identified region in the first EOFM map and an intensity of a corresponding region of the reference map, and detect one or more hardware trojans in the IC if there is no match.

In one embodiment, the system further includes, in part, an optical beam generator configured to generate and pass an optical beams to a backside of the integrated circuit, a beam splitter configured to receive one or more reflected optical beams reflected from the active layer of the integrated circuit, a photodetector configured to measure the one or more reflected optical beams received by the beam splitter, and a spectrum analyzer configured to extract amplitudes of the one or more reflected optical beams at a frequency.

In one embodiment, the reference map is associated with a layout of the IC known not to include hardware trojans. In one embodiment, the reference map is a second EOFM associated with the IC. In one embodiment, the hardware Trojan is one of a sequential hardware Trojan or a combinational hardware Trojan.

In one embodiment, the system is further configured to apply power to the IC, and apply a clock signal to the IC to generate the reference map. In such embodiments, the system is further configured to place the IC in a scan mode, and apply an alternating bit pattern to a scan chain disposed in the IC to generate the EOFM of the IC.

In one embodiment, the system is further configured to generate the first EOFM at a first frequency, generate a second EOFM of the IC at a second frequency, and subtract data associated with the first EOFM from the data associated with second EOFM to mitigate noise. In one embodiment, the system is further configured to apply a threshold to convert the first EOFM data to binary data. In one embodiment, the system is further configured to apply erosion and dilation to the binary data to mitigate noise.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 1 shows a process flow for using a foundry to fabricate an integrated circuit.

FIG. 2A is a block diagram of an exemplary laser probing system, in accordance with some embodiments of the present disclosure.

FIG. 2B shows an exemplary integrated circuit that includes a multitude of sequential elements, in accordance with some embodiments.

FIGS. 5A-5C illustrate an exemplary sequential element identification process, in accordance with some embodiments.

FIGS. 6A-6B is a laser patterned image and an EOFM image of an exemplary field-programmable gate array (FPGA), in accordance with some embodiments.

FIG. 7 is a representation of an FPGA layout view of a 4-bit counter, in accordance with some embodiments.

FIGS. 8A-8B are layout representation of a 4-bit counter and its EOFM measurement respectively, in accordance with some embodiments.

FIGS. 9A-9C are further layout representations of the 4-bit counter shown in FIG. 8A, in accordance with some embodiments.

FIGS. 11A-11H show various image processing techniques used to automate trojan detection, in accordance with one embodiment of the present invention.

FIGS. 14A-14L illustrate various image processing techniques used to automate hardware Trojan detection, in accordance with one embodiment of the present disclosure.

FIGS. 15A and 15B show exemplary processed EOFM measurements to detect hardware trojans, in accordance with some embodiments.

DETAILED DESCRIPTION

Figure 3:
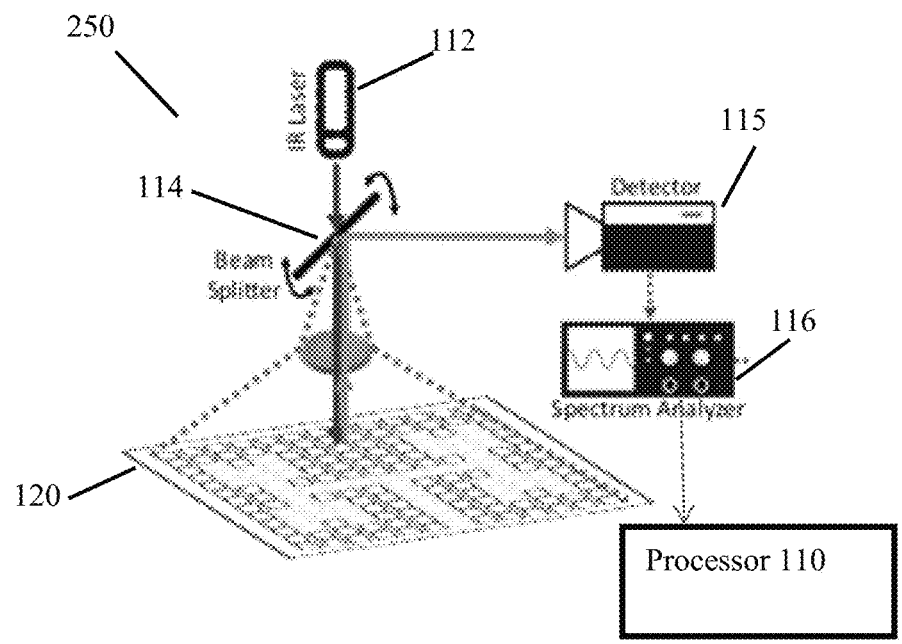
FIG. 3 shows various components of laser probe system shown in FIG. 2A, in accordance with one embodiment of the present disclosure.

Integrated circuits (ICs) fabricated at an untrusted foundry are vulnerable to hardware Trojan insertion. Trojans can be inserted into design files by modifying their existing functionality or by inserting additional circuitry into unused silicon areas. Identifying Trojans requires either a design-level modification or a complex test processes. Conventional hardware Trojan detections may be generalized as destructive or non-destructive. Destructive techniques are relatively accurate, but render the IC unusable. Conventional non-destructive techniques, however, are relatively inaccurate in detecting the Trojans and require device-specific input patterns to activate the desired circuitry within the IC.

In accordance with one embodiment of the present disclosure, a non-destructive laser probing technique is used to detect malicious hardware Trojans (alternatively referred to herein as Trojan). In one embodiment, the non-destructive laser probe detects sequential hardware Trojans by leveraging the fact that the sequential hardware Trojans can be triggered by a clock signal, which can be identified using electro-optical frequency mapping (EOFM). Such embodiments are thus adapted to identify Trojan flip-flops using image processing techniques. Moreover, embodiments disclosed in the present disclosure do not require backside thinning of the IC. Furthermore, in some embodiments only sequential components of a trusted IC are used to identify Trojans.

FIG. 1 shows a simplified view of an IC design and fabrication supply chain. An IC design house 10 may use intellectual property (IP) supplied by third party vendors that may be scattered around the world. The inclusion of the IP may potentially compromise the design. The design file 15 is subsequently transferred to an untrusted foundry 20 to fabricate the IC. Since foundry 20 manufactures the IC, foundry 20 often has full visibility into the IC design files and may insert hardware Trojans directly into the design, thus causing the original circuit to be modified. The IC 25 fabricated by foundry 20 is subsequently delivered to an end user 25 which may deploy the IC in, e.g., cars 30, military equipment 35, consumer products 40, and the like. In the following, it is assumed that at least one sequential element (flip-flop) is outside of the scan chain to avoid easy detection.

FIG. 2A is a simplified block diagram of an exemplary laser probing system 200 adapted to form an EOFM map and detect trojans, in accordance with one embodiment of the present disclosure. Laser probing system 200 is shown as including, in part, a processor 110, an optical beam generator 112, a beam splitter 114, a photodetector 115, and a spectrum analyzer 116. Laser probing system 200 is adapted to generate an elemental map of an active layer of an integrated circuit (also referred to herein as DUT) using an electro-optical frequency mapping (EOFM). FIG. 2B shows an exemplary integrated circuit 120 that includes a multitude of sequential elements 122, such as flip-flops, latches, and the like. Laser probing system 200 is adapted to detect trojans disposed in IC 120 as described below.

FIG. 3 shows various components of laser probe system 200 also shown in FIG. 2A, in accordance with one embodiment of the present disclosure. The infrared beam generated by optical beam generator 112 impinges on the backside silicon of IC 120. Since silicon is transparent to infrared wavelengths, the beam penetrates the silicon substrate and reflects off the active layer of the IC. The variations in current density in the active layer modulate the laser signal as the index of reflection changes with the current flow. The modulated laser light is reflected on to a beam splitter 114 and measured with a photodetector 115. The frequency information of the current passing through an IC cell receiving the infrared laser beam is captured by the reflected optical beam, detected by photodetector 115 and processed by spectrum analyzer 116. Spectrum analyzer 116 determines the frequency band of the received signal and delivers the frequency band to processor 110. To create a mapping of the entire device 120, the above process may be repeated while subtle adjustments is made in the beam splitter to cause the laser spot to scan the visible area. These amplitudes are then stitched together to form a frequency map with bright spots which correlate to high current cells at a given frequency.

Figure 4:
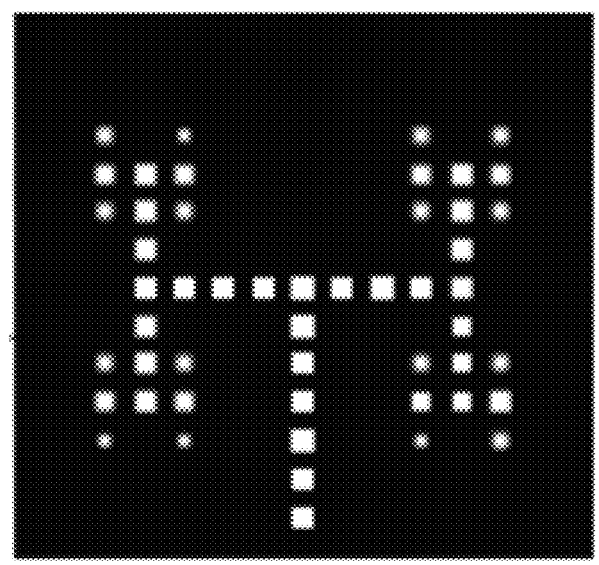
FIG. 4 illustrates an EOFM measurement, in accordance with some embodiments of the present disclosure.

An EOFM map/image so generated includes information representative of the intensity differences between various types of cells within an IC. For example, the EOFM image shown in FIG. 4 is generated with laser probe system of FIG.

3. The EOFM image shows an H-clock tree with decreasing current flow in regions that have local routing compared to other regions that have global routing.

In some embodiments, the EOFM map (also referred to herein as elemental map) generated from a suspect IC is compared to an element-filtered design or an elemental map of a similar IC known not to have been tampered with. The IC that is known to be free of any trojans is referred to herein alternatively as a golden IC/design. If the elemental map of the golden design or golden IC matches that of the suspect IC, the suspect IC is considered free of any hardware trojans. Alternatively, if the elemental map of the suspect IC fails to match that of the golden design or golden IC, the suspect IC is considered as having hardware trojans.

FIGS. 5A-5C illustrate an exemplary sequential element identification process, in accordance with some embodiments. FIG. 5A shows a sample IC layout design of a golden IC. In FIG. 5B, all sequential circuit elements (or sequential cells) of FIG. 5A are highlighted in green rectangles, using a command in an IC Compiler, such as Synopsys' IC Compiler. By removing the unnecessary layers from the view, FIG. 5C shows green rectangles (e.g., flip-flops) within the design. The rectangles in FIG. 5C are scan flip-flops and may be directly correlated to the EOFM measurements taken from a fabricated suspect IC. If the two images do not match, the suspect IC is considered as having been tampered with and additional steps may be performed to identify any trojan.

In some embodiments, the IC design is mapped onto a field-programmable gate array (FPGA). FIG. 6A shows a PolarFire™ FGPA, commercially available from Microsemi corporation and fabricated on a 28 nm process node. This FPGA was selected as its structure most closely correlates with that of a standard-cell based ASIC design layouts. The FPGA is configured so as to maintain rows of regular structures, which include combinational logic, buffers, and flip-flops (similar to the standard cell design style). FIG. 6B shows an EOFM measurement of the FGPA shown in FIG. 6A. FIG. 6A also shows the regular physical structures disposed in the programmable FPGA fabric. Each such structure is positioned in a vertical stack. The main difference between such an FPGA and a standard ASIC is that each vertical stack in the FPGA accounts for two programmable structures rather than a single fixed arrangement of cells. As such, the FPGA is used as a cost-effective device to display differences in a circuit that is trojan-free and one that has trojan-inserted circuitry.

Using the commercially available Microsemi Libero SoC IDE, the circuit designs were implemented onto the FPGA fabric. The layout of a simple 4-bit counter is shown in FIG. 7. As described above, the FPGA includes rows of vertical stacks. Each stack contains 3 elements, namely a buffer (the top element represented as a blue triangle/logic buffer), a flip-flop (the middle element represented by the purple rectangles), and a combinational logic segment (the bottom element represented as the blue 2-input AND gate). FIG. 7 also shows the elements, highlighted in yellow, that have been programmed within the current bitstream. The advantage of this specific FPGA fabric for emulating ASIC-based sequential Trojan detection is that the clock is only routed to a specific flip-flop when the individual cell is active (highlighted yellow). This results in EOFM measurements which only observe placed and routed sequential elements rather than all possible locations for flip-flop placement.

By using an EOFM technique, in accordance with embodiments of the present disclosure, locations in the device which oscillate at a specified clock frequency can be differentiated from those that are not. The measured 2-D locations oscillating at the target frequency are shown as gray-scale images in FIG. 8B. The images may be evaluated by locating the highest intensity white pixels, which correlate to high amplitude signals at the frequency of interest.

FIG. 8A also represents the circuit design file for a 4-bit counter as defined by using a the Microsemi Libero IDE. The layout image shown in FIG. 8A has been rotated 180 degrees from that seen in FIG. 7. The rotation aligns the layout view from the Libero IDE with the physical backside images seen when acquiring EOFM measurements. Additional measures may be required to compensate for the fact that the DUT is measured from the backside rather than the top-side view of the layout IDE.

By observing the regions outlined in red and orange in FIGS. 8A and 8B, the yellow highlighted purple rectangles (representing active flip-flops) may be directly correlated to the bright spots in the EOFM measurement. These flip-flops are the locations which are targeted for sequential Trojan detection using EOFM. Other elements switching at the clock frequency will also be observable using this technique, such as local and global clock buffers (see FIG. 6B). The elements are used to authenticate the given DUT using only the knowledge of the clock frequency and the golden design information. Accordingly, individual sequential element locations are identified by scanning the optical probe across the backside of the DUT. By comparing the comprehensive EOFM measurement with the golden design information, the locations of clocked elements within the design are verified.

Figure 9B:
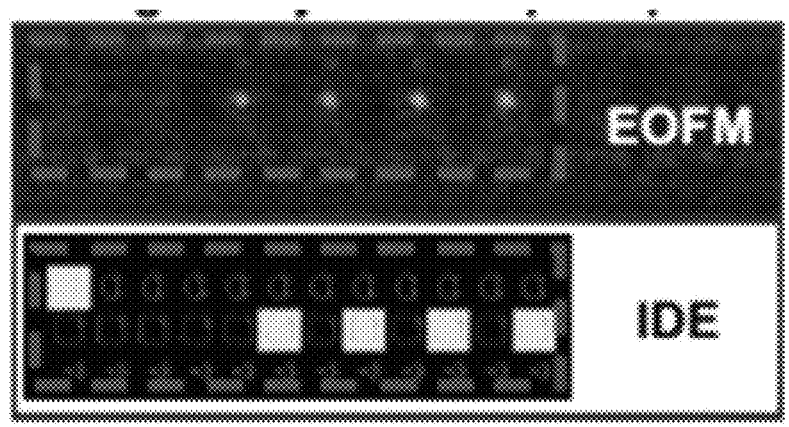
Figure 9C:
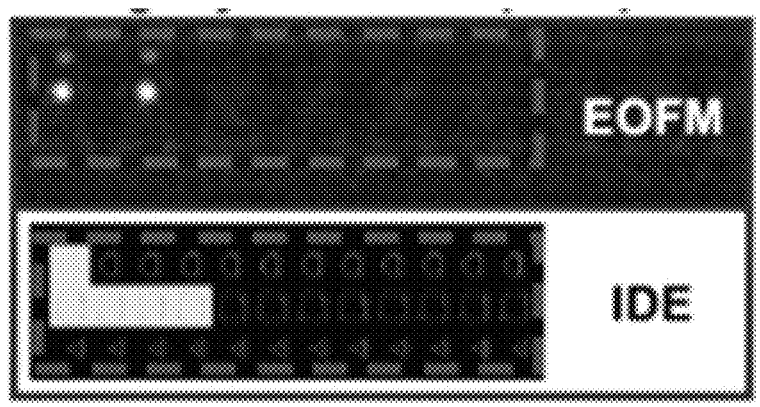

The three 4-bit counters of FIG. 8A are also shown in FIG. 9A-9C. Each counter is generated from an identical netlist, however, the placement of the flip-flops has been modified within the red outlined areas. The left-adjusted image shown in FIG. 9A shows the flip-flops on the left of the group of cells while the right-adjusted image shown in FIG. 9B shows the flip-flops on the right side of the group. Accordingly, embodiments of the present disclosure show that a single modification to the placement of a clocked element can be identified with high confidence and spatial accuracy. An unprogrammed flip-flop between each of the placed flip-flop cells avoids overlapping signals due to the dual-stack structure of the FPGA.

FIG. 9C shows an EOFM measurement of a tight-fit spaced 4-bit counter, which demonstrates this accumulation effect. The tight-fit spacing means both flip-flops in the vertical stack are utilized, thereby resulting in brighter white spots than those of the distributed flip-flops shown in FIGS. 9A and 9B. This is due to the higher amplitude current passing through the optical probe spot at the target clock frequency. This amplitude difference can be identified and related to the golden design to determine if an accurate number of (and their sizes) gates is present within a given area. This amplitude differential can also be seen within the clock buffers and gating logic in the middle row and bottom left corner of FIG. 8B. The high intensity spots oscillating at the clock frequency are the brightest points in the image due to the relatively large currents passing through the locations. It is understood that the rows between relevant programmable stacks that include the switch matrix-based signal routing and clock buffers are not represented within the Libero IDE, and are unique to FPGA-based designs.

Figures 10A, 10B, 10C:
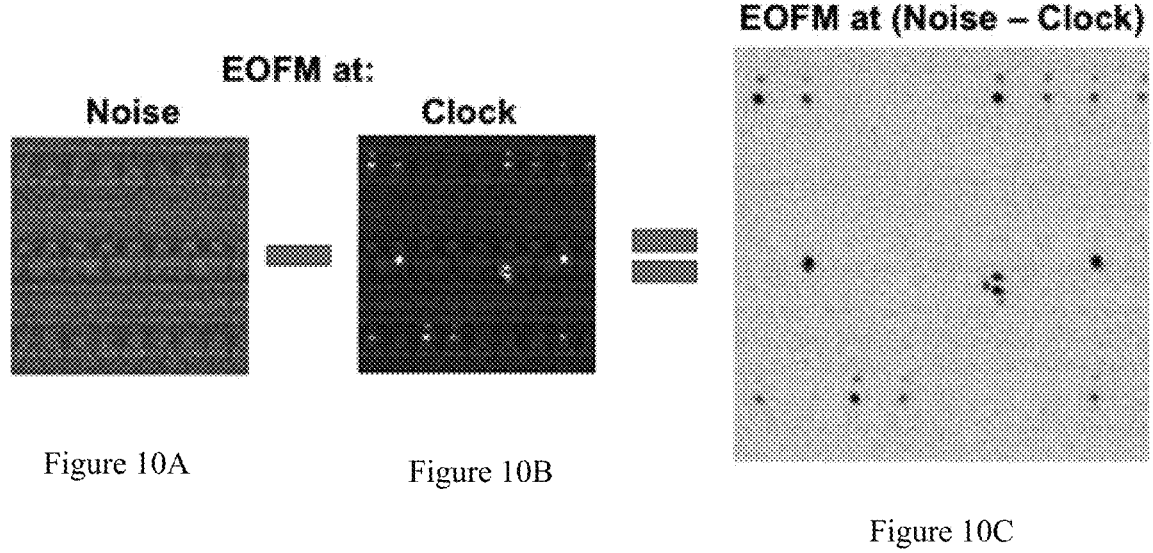
FIG. 10A shows an EOFM measurement made at a first frequency.
FIG. 10B shows an EOFM measurement made at a second frequency.
FIG. 10C shows the result of subtracting the measurements shown in FIG. 10A from that shown in FIG. 10B.

To mitigate the effects of background noise, which may be present in an EOFM map, in some embodiments differential mapping is used. FIG. 10A-10C illustrates a differential EOFM measurement that removes a significant portion of the noise, in accordance with some embodiments. FIG. 10A shows an EOFM measurement made at a frequency not used by or operated by the device, e.g., a 49 MHz. FIG. 10B shows the EOFM measurement of the device made at a frequency of 50 MHz. By subtracting the measurement made at e.g., 49 MHz from the measurement made at, e.g., 50 MHz, the differential EOFM measurement shown in FIG. 10C is obtained. The subtraction eliminates a substantial amount of the noise thus resulting in a high signal to noise ratio (SNR) image. The high SNR image enables a better identification of the sequential elements of interest and facilitates post-processing of the data. The differential measurements invert a color space resulting in sequential elements appearing as black pixels or groups of pixels since the clock frequency measurement is subtracted from the noise measurement. In some embodiments, both the clock frequency and noise measurements are made concurrently, thus removing the risk of potential variations from repeated measurements.

In some embodiments, non-local means (NLM) filtering is used to eliminate background noise that may occur during a measurement. The NLM filtering analyzes the grey levels within a neighborhood of background noise to create a template for the noise signature. The noise signature is subsequently compared to other similar noise signatures across the entire image. Thereafter, a filter averaging operation is used to remove the noise from the measurement. The process of removing noise makes the sequential elements stand out in the filtered image with a high SNR image ready for spatial and amplitude matching.

In accordance with some embodiments, image processing and analysis associated with trojan detection is automated, as shown in FIG. 11A-11H. First, the EOFM measurements are processed to identify active flip-flops locations within the DUT. Next, to determine the corresponding locations from a golden layout information, physical layout approximation is conducted. For both the EOFM measurement and layout approximation procedures, each image is converted from RGB values to grayscale and Gaussian blur is applied to smooth out the images as shown in FIG. 11A. Once features are differentiated from the speckle noise, thresholding is applied to change the images to binary data, and erosion and dilation are performed to remove unwanted noise, as shown in FIG. 11B.

Following the pre-processing steps, contour detection is performed on the EOFM images. Once the contours are detected, the programmable interconnects are masked and labeled to avoid detection, as shown in FIG. 11C. This process is conducted on a subset of the components and scaled as they can be identified within regular structures of the FPGA.

Next, an integrated development environment (IDE), such as that commercially available from Microsemi corporation (www.microsemi.com), is used during the physical layout approximation steps. First, the individual flip-flops are identified within the layout, as shown in FIG. 11D. Next, flip-flop pairs are detected within the layout since the 2 flip-flop wide programmable stacks are present within the exemplary FPGA device, as shown in FIG. 11E. After pairing, a rectangle is drawn around the pairs and the rectangle edges are detected using an edge detection technique, as shown in FIG. 11E. Next, the Hough line transformation is used to detect lines, as shown in FIG. 11F. At this stage, the IDE layout has been transformed into a similar representation as the EOFM measurements and thus undergoes a number of pre-processing steps.

To identify expected flip-flop locations from the golden layout, each pair is evaluated for active (shown in yellow) flip-flops. If active flip-flops are found, contours are drawn around them. The layout is then resized vertically and horizontally to best approximate the locations of the flip-flops within the EOFM measurements. The previously drawn contours are detected, masked and labeled to complete the physical layout approximation steps.

To map the two representations against each other, nearest neighbor processing is used to find the nearest neighbor based on the resized and masked layout and the EOFM masked image. Thereafter, they are sorted based upon the best neighbor. A tie breaker is created for overlapping values. Sorted values that are not common are removed from both the x and y axis. As horizontal spacing is more correlated between the two images, extra weight may be applied to, for example, the x-axis. When comparing ASIC layouts, this step may not be necessary as the GDSII layout should exactly match the fabricated DUT, thus requiring substantially less processing and consideration. Next, the best candidate for nearest neighbor is returned, and the image is ready to be mapped.

The merged plot shown in FIG. 11G. is generated by first drawing, for example, red rectangles based on the EOFM measurement's nearest neighbor results. Then, e.g. blue rectangles obtained based on the layout image are drawn and appended to the EOFM rectangles. To remove any artifacts such as double identification from a single programmable stack, a heat map is created. The contours are identified in the new image, and the intensities within each rectangle are analyzed. If two, e.g., red rectangles are identified, the midpoint between them is taken and merged to compensate. The mapping is then overlaid onto the EOFM image to identify a Trojan cell. The green and red rectangles drawn, as described above, represent matching cells and identified trojan cells, respectively, as shown in FIG. 11H. As described above, the entire process described above with reference to FIGS. 11A-11H is automated.

To increase the automatic detection of hardware Trojans within zoomed images, some embodiments of the present disclosure use local maxima detection. Sequential elements are identified by their intensity above a minimum threshold value. Local regions throughout the IC may not have identical background noise, which can result in false positives in threshold-based implementations. By observing the prominence of each peak across a row of pixels, a relative signal-to-noise ratio (SNR) value may be estimated for each pixel. A large difference in amplitude between a local maximum and its neighboring minima increases the likelihood of the maximum point being a true positive. Each row of the image is analyzed separately, placing white pixels at each local maximum above a given level of prominence. This process is also conducted across all columns.

Figure 12:
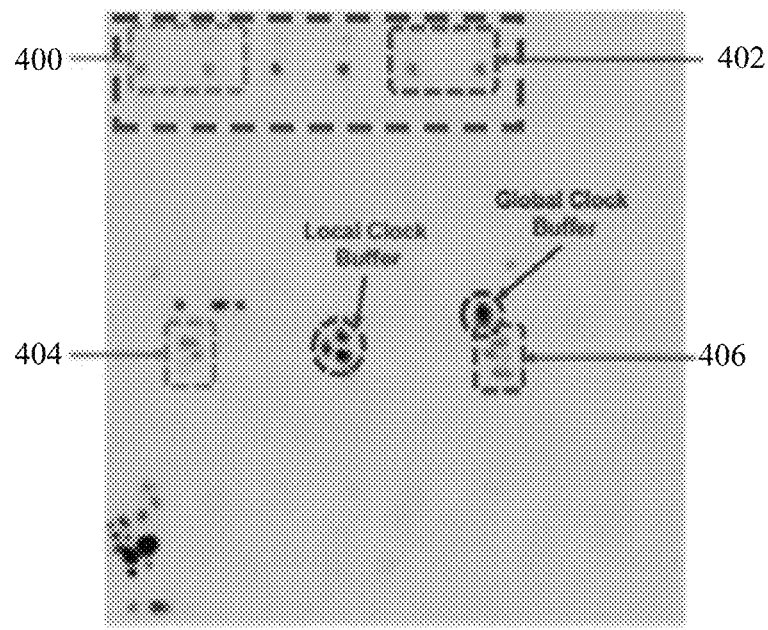
FIG. 12 is an EOFM of an overlay comparison of left and right-adjusted 4-bit counters respectively, in accordance with some embodiments.

Identifying differences in EOFM measurements may be achieved by observing differential representations. FIG. 12 is an overlay comparison of the left and right-adjusted of the 4-bit counters in green and magenta colors respectively, in accordance with some embodiments. Complementary colors are used to provide easy differentiation between the two acquisitions, as well as identifying the similarities. The left-adjusted 4-bit counter 400 is shown in green color, and the right-adjusted counter 402 is shown in magenta color. Also shown are left-adjusted routing logic 404 and right-adjusted routing logic 406. The overlapping segments create a black spot on the light background, showing the similar mappings. The images have been aligned to provide the best possible overlap as microscopic shifts may occur between the time each measurement was taken. This process may also be used when comparing ASIC measurements to its design approximation.

Figure 13A:
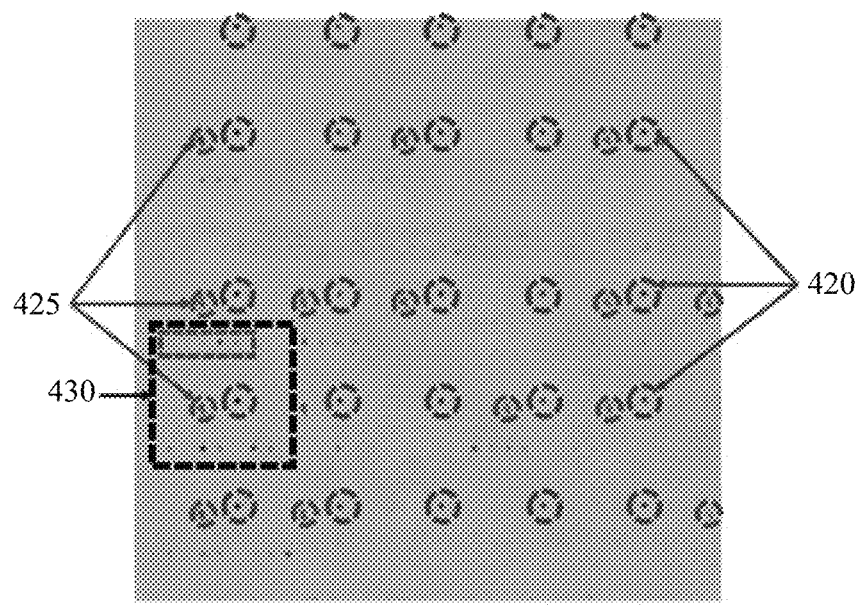
FIG. 13A shows an EOFM processed at 1× laser offset zoom, in accordance with some embodiments.

FIG. 13A shows a denoted NLM layout image processed at 1× laser offset zoom. The Trojan-free design is represented using a green color, and the trojan-inserted design is represented by a magenta color. Due to the large field of view, fine details regarding the Trojan locations are difficult to visualize. The global clock buffers are fixed in a grid and are located within the green dotted circles 420. The global clock buffers can be seen throughout the DUT regardless of the presence of an active flip-flop. The local clock buffers are identified by the black dots within the blue dotted circles 425. Unlike the global buffers, the local buffers are only enabled when there are actively programmed flip-flops within a given region.

Figure 13B:
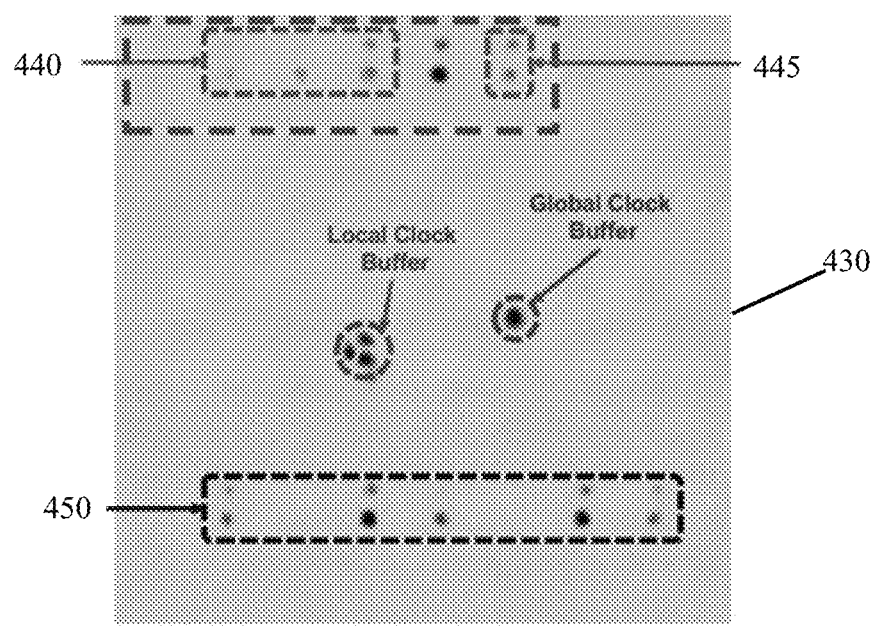
FIG. 13B shows an EOFM of a portion of the image shown in FIG. 13A at 4× laser offset zoom, in accordance with some embodiments.

To more effectively visualize the Trojan cells, a single frame area has been identified within the black dotted square 430. Square 430 is shown in FIG. 13B using a 4× laser offset zoom. A number of variations of Trojan insertion are shown. Shown within areas 440 are trojan flip-flops inserted in areas with unused silicon. Three columns are visible within this region. The two left-most columns include feint magenta spots, while the right-most column shows high intensity magenta spots. The left two areas only have a single flip-flop active within each stack. However, the bright magenta spots on the right have both flip-flops activated within the single stack.

In addition to the unused silicon block, a Trojan has been inserted within a populated logic stack 445. As referenced on the right side of FIG. 13C, the stack containing both green and magenta spots has been pre-populated with a single flip-flop in the Trojan-free design. The difference between the original green representation and Trojan-inserted green and magenta version can still be seen. For comparison, the neighboring stack shown as two black spots maintained two active flip-flops in both benchmarks. Similarly, the logic in the black dotted rectangle 450 maintained the same active flip-flops in both versions. This results in the overlay image show all black spots within this region.

To procedurally identify actively clocked elements within the EOFM measurements, post-processing steps may be required. In some embodiments, the laser probing system is capable of multiple types of zooming. Both optical and laser offset zooming may be used. However, optical enlargement is obtained by switching objective lenses. Measurements containing multiple pixels representing a single clocked element may provide a better image than full translation per pixel (1×) measurements. Image processing techniques for 1× zoom measurements primarily depend upon individual pixel brightness, as each flip-flop may only be represented by a single pixel. For larger zoom levels, additional techniques such as local maxima detection can be used. Prior to sequential element identification, the raw files are filtered to provide a higher signal to noise ratio (SNR) image. In some embodiments, threshold-based binarization is used to identify individual pixels of interest within the larger image.

In accordance with some embodiments, combinational hardware Trojans are detected by applying a test pattern to a scan chain that includes combinational logic. By applying the test pattern to the IC in a loop with a pre-defined frequency, EOFM measurements are performed to detect combinational gates switching at that frequency. A comparison between the measured EOFM and the data corresponding to the layout data of a reference (golden) design results in the detection of the combinational hardware trojans, as described in detail above.

In accordance with some embodiments, Trojans are identified without using a golden design. To achieve this, the laser probing technique EOFM is used to collect data at two different frequencies. Image processing techniques are subsequently used to automatically detect Trojans in the collected data set. During the EOFM data collection, the suspect IC is positioned under the microscope objective lens. The IC is then powered on and a clock signal is applied to the circuit. Assuming the clock is not gated, the clock signal propagates throughout the sequential elements of the DUT.

First, using EOFM targeted at the clock frequency, a map of all sequential elements within the circuit, both benign and malicious, are identified. Next, the suspect IC is powered on and put into scan mode, with both the clock and the scan inputs applied to the IC. While providing an oscillating input of alternating 1's and 0's, a new frequency may be derived. For example, with a clock frequency of 50 MHz, a repeating scan input pattern of 101010 . . . may be used to create a nearly square wave at 25 MHz (i.e., half of the clock frequency). An EOFM measurement made at the oscillating pattern provides a second reference point that identifies all scan flip-flops connected to the scan chain.

The EOFM measured at the clock frequency is then compared to the EOFM measured during the oscillating pattern of the scan chain to determine the locations of the sequential Trojans outside of the scan chain, as described further below. Ideally, performing a direct comparison between the two frequency measurements should determine the location of the sequential Trojans as all scan flip-flops should contain both frequencies. However, various components, such as global and local clock buffers will be present in the EOFM clock measurement, but potentially missing from the scan input frequency measurement.

To achieve an accurate and automated detection, image processing techniques are used to identify flip-flops and differentiate them from other circuit elements, as shown in FIGS. 14A-14L. First, the raw EOFM measurements at the clock frequency and the scan input oscillating frequency, shown respectively in FIGS. 14A and 14F, are pre-processed. The active flip-flops causing high-intensity spots are segmented out from the background noise for further analysis. Histogram equalization, which takes the most frequent intensity values and stretches them throughout the image, causes the features (e.g., flip-flop responses) to have a better contrast when compared to the background.

Next, as shown in FIG. 14B, a Gaussian filter with a kernel size of, e.g., seven by seven may be used to remove all unwanted white noise. A median filter, with a kernel size of three by three, may be applied to smooth the image to preserve edges and to remove any remaining fine background noise.

Next, as shown in FIG. 14C, a thresholding technique is applied to convert the grayscale image into a binary image. This eliminates the black background and segments the active flip-flop regions in the images.

After thresholding, erosion and dilation are performed iteratively, as shown in FIG. 14D, to clean the image. After pre-processing the measurements, connected component analysis is used to isolate potential true positives. Following this analysis, only high intensity points, which are stored in a mask, will remain. Each region is labeled to automate the remainder of the process, and each unique label is iterated over. If the label is e.g., 0 (background), it is ignored. If the regions is not labeled as background, a mask is generated for that label.

Next, as shown in FIG. 14E, contours are identified. Contours join all points along a boundary with the same intensity and are used for object detection, recognition, and shape analysis. Once the contours are formed for the regions of interest, bounding boxes (e.g., rectangles) are drawn around the regions, as shown in FIG. 14F. The x and y coordinates as well as the width and height of the bounding boxes are stored for processing. The bounding boxes from the clock frequency EOFM measurement are mapped to the scan input EOFM measurement for detection, as shown in FIG. 14I.

Once the mapping is completed, the intensity values within the bounding boxes are analyzed by calculating the bright pixel values inside the bounding boxes. After the pixel values are calculated for both EOFM measurement images, a difference between the measurements is made. To determine if a flip-flop region should be labeled as a Trojan flip-flop (e.g., red) or scan flip-flop (e.g., green), a threshold range is set. If the calculated difference is greater than the threshold the region is labeled as a Trojan, and if the difference is within the threshold range it is labeled as non-malicious. FIG. 14H shows the result of filtering and thresholding applied to the data shown in FIG. 14G. FIG. 14I shows the result of bounding box mapping applied to the data shown in FIG. 14H. FIG. 14J shows the result of erosion and dilation applied to the data shown in FIG. 14I. FIG. 14K shows the result of detection applied to the data shown in FIG. 14J. FIG. 14L shows the final result of the detection of trojan hardware.

An example of a processed EOFM measurements is shown in FIGS. 15A and 15B. The red-colored boxes in FIG. 15A identify the physical location of the suspect flip-flops at the clock frequency. The blue region illustrates the effect of filtering made to remove irrelevant elements such as the local and global clock buffers. FIG. 15B shows the EOFM response of the same area, but at the 25 MHz oscillation frequency of the scan input pattern. The measurement provides significantly more extraneous information, since in addition to the flip-flop transistors, there are also logic gates passing values throughout the circuit due to the scan input patterns. As described above, the exemplary programmable stacks are highly dense structures which include six separate programmable items. However, information is still extracted from this image using embodiments of the present disclosure The green boxes in FIG. 15B represent authentic scan flip-flops, as expected within Trojan-free ICs. However, the red boxes signify Trojan flip-flops which are disconnected from the scan chain.

Embodiments of the present may be equally applied to authenticate commercial-off-the-shelf components by using existing clock trees and scan infrastructure within ICs, and comparing two EOFM images of the clocked elements, as described in detail above.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best use the disclosure and various described embodiments with various modifications as are suited to the particular use contemplated.

What is claimed is:

1. A method comprising:
generating a first electro-optical frequency map (EOFM) of an active layer of an integrated circuit (IC) by:
 powering on the IC;
 applying a first clock signal to the IC at a first frequency such that the first clock signal propagates through sequential elements of the IC; and
 identifying the sequential elements within the IC;
generating a second EOFM of the active layer of the IC by:
 placing the IC into a scan mode;
 applying the first clock signal and a test pattern comprising scan inputs the IC such that a second frequency that is different from the first frequency is derived; and
 identifying all sequential elements connected to a scan chain of the IC;
comparing the first EOFM of the IC with the second EOFM of the IC to determine whether there is a match between an intensity of an identified region in the first EOFM and an intensity of a corresponding region of the second EOFM of the IC; and
responsive to determining there is no match, detecting one or more hardware Trojans in the IC.

2. The method of claim 1, wherein one or more of the first EOFM or the second EOFM is compared to a reference map associated with a golden IC known not to include hardware Trojans.

3. The method of claim 2, wherein the reference map is generated by:
applying power to the golden IC;
applying a clock signal at the first frequency to the golden IC.

4. The method of claim 1, wherein the first frequency is a frequency not used by or operated by the IC.

5. The method of claim 1, wherein generating the first EOFM of the active layer of the IC further comprises:
passing an optical beam to a backside of the IC while activating the IC;
receiving one or more reflected optical beams reflected from the active layer of the IC;
extracting amplitudes of the one or more reflected optical beams at the first frequency; and
generating the first EOFM based at least in part on the extracted amplitudes.

6. The method of claim 1, wherein the hardware Trojan is one of a sequential hardware Trojan or a combinational hardware Trojan.

7. The method of claim 1, wherein comparing the first EOFM to the second EOFM of the IC comprises:
segmenting out active flip-flops causing high-intensity spots;
applying a Guassian filter to remove unwanted white noise;
converting grasycale images to binary images;
iteratively applying erosion and dilation;
generating bounding boxes from the first EOFM and mapping them to the second EOFM by identifying contours that join points along a boundary with a same intensity; and
determining whether there is a match based at least in part on the bounding boxes.

8. The method of claim 7, wherein converting the grayscale images to binary images comprises:
applying a threshold to convert data associated with the first EOFM to binary data; and
applying erosion and dilation to the binary data.

9. The method of claim 1, identifying the sequential elements within the IC comprises identifying a map of all of the sequential elements within the IC, whether benign or malicious.

10. The method of claim 1, wherein the test pattern comprises an alternating bit pattern.

11. A system comprising:
a memory storing executable instructions; and
a processor coupled to the memory, wherein when the executable instructions are executed, the system is configured to:
   generate a first electro-optical frequency map (EOFM) of an active layer of an integrated circuit (IC) by:
      powering on the IC;
      applying a first clock signal to the IC at a first frequency such that the first clock signal propagates through sequential elements of the IC; and
      identifying the sequential elements within the IC;
   generate a second EOFM of the active layer of the IC by:
      placing the IC into a scan mode;
      applying the first clock signal and a test pattern comprising scan inputs the IC such that a second frequency that is different from the first frequency is derived; and
      identifying all sequential elements connected to a scan chain of the IC;
   compare the first EOFM of the IC with the second EOFM of the IC to determine whether there is a match between an intensity of an identified region in the first EOFM and an intensity of a corresponding region of the second EOFM of the IC; and
   responsive to determining there is no match, detect one or more hardware Trojans in the IC.

12. The system of claim 11, further comprising:
an optical beam generator configured to generate and pass an optical beam to a backside of the IC;
a beam splitter configured to receive one or more reflected optical beams reflected from the active layer of the IC;
a photodetector configured to measure the one or more reflected optical beams received by the beam splitter; and
a spectrum analyzer configured to extract amplitudes of the one or more reflected optical beams at the first frequency.

13. The system of claim 11, wherein one or more of the first EOFM or the second EOFM is compared to a reference map associated with a golden IC known not to include hardware Trojans.

14. The system of claim 13, wherein the system is further configured to generate the reference map by:
applying power to the golden IC; and
applying a clock signal at the first frequency to the golden IC.

15. The system of claim 14, wherein comparing the first EOFM of the IC to the second EOFM of the IC comprises:
segment out active flip-flops causing high-intensity spots;
apply a Guassian filter to remove unwanted white noise;
convert grasycale images to binary images;
iteratively apply erosion and dilation;
generate bounding boxes from the first EOFM and map them to the second EOFM by identifying contours that join points along a boundary with a same intensity; and
determine whether there is a match based at least in part on the bounding boxes.

16. The system of claim 15, wherein to convert the grayscale images to binary images, the system is further configured to:
apply a threshold to convert data associated with the first EOFM to binary data; and
apply erosion and dilation to the binary data.

17. The system of claim 11, wherein the first frequency is a frequency not used by or operated by the IC.

18. The system of claim 11, wherein the hardware Trojan is one of a sequential hardware Trojan or a combinational hardware Trojan.

* * * * *

UNITED STATES PATENT AND TRADEMARK OFFICE
CERTIFICATE OF CORRECTION

PATENT NO. : 12,105,858 B2  
APPLICATION NO. : 17/196035  
DATED : October 1, 2024  
INVENTOR(S) : Tehranipoor et al.

Page 1 of 1

It is certified that error appears in the above-identified patent and that said Letters Patent is hereby corrected as shown below:

In the Claims

Column 12,  
Line 53, in Claim 7, "Guassian" should read --Gaussian--;  
Line 55, in Claim 7, "grasycale" should read --grayscale--.

Column 14,  
Line 19, in Claim 15, "Guassian" should read --Gaussian--;  
Line 20, in Claim 15, "grasycale" should read --grayscale--.

Signed and Sealed this  
Fourteenth Day of January, 2025

Derrick Brent  
*Acting Director of the United States Patent and Trademark Office*